United States Patent [15] 3,655,424
Orowan [45] Apr. 11, 1972

[54] ADHESIVE TAPE
[72] Inventor: Egon Orowan, Belmont, Mass.
[73] Assignee: Massachusetts Institute of Technology, Cambridge, Mass.
[22] Filed: May 24, 1968
[21] Appl. No.: 731,769

[52] U.S. Cl. ............................. 117/68.5, 29/458, 85/50 AT, 117/8, 117/122 R, 117/127, 117/128.4
[51] Int. Cl. ........................................................ C09j 7/02
[58] Field of Search .............. 117/68.5, 122 R, 122 H, 122 P, 117/127, 128.4, 27, 31; 85/50 AT, 1 JP; 151/38; 29/458; 161/213–225

[56] References Cited

UNITED STATES PATENTS

| | | | |
|---|---|---|---|
| 2,601,336 | 6/1952 | Johannsen | 117/122 UX |
| 3,271,232 | 9/1966 | Moore | 161/175 |
| 1,793,116 | 2/1931 | Monroe | 151/38 |
| 2,535,852 | 12/1950 | Hatfield | 117/68.5 UX |
| 2,650,185 | 8/1953 | Larson et al. | 117/68.5 X |
| 3,066,060 | 11/1962 | Gross | 161/215 |
| 3,458,132 | 8/1969 | Newton | 151/38 X |

Primary Examiner—William D. Martin
Assistant Examiner—Bernard D. Pianalto
Attorney—Thomas Cooch, Martin M. Santa and Robert Shaw

[57] ABSTRACT

An adhesive tape embodying a core strip (preferably a metallic strip) and an adhesive upon the major surfaces of the strip. The cross section of the core has a substantially thick portion that diminishes in thickness towards the edges. In a preferred embodiment the edges are provided with fins that prevent the adhesive from being squeezed from between structural parts joined by the tape as the parts are drawn together by rivets, bolts, or the like.

17 Claims, 7 Drawing Figures

PATENTED APR 11 1972

3,655,424

INVENTOR:
EGON OROWAN
BY Robert Shaw
ATTORNEY

ADHESIVE TAPE

The invention herein described was made in the course of work performed under a contract with the Air Force Office of Scientific Research.

The present invention relates to adhesive tapes that embody a carrier strip and an adhesive and are particularly useful in connection with riveted and pinned joints.

Adhesive bonding has been successfully used in, for example, aircraft manufacture for joining metallic parts. In joining structurally important parts of the aircraft, designers are reluctant to entrust the bond to adhesion alone, mainly because the accidental presence of dirt may cause local weakness that cannot be recognized by nondestructive testing. It would be desirable, however, to use adhesives together with rivets or pins in such a manner as to eliminate a well known shortcoming of the latter. Hot riveting in steel structures prevents sliding of the joined parts approximately up to the load at which the rivet would suffer shear fracture. Cold riveted joints in light alloy structures, however, are not fully immobilized by friction; and slight relative movement between the members under cyclic loading results in fretting at the abutting surfaces of the joint and at the rivet holes, thereby producing, eventually, fatigue cracks. The practice has often been, therefore, to introduce between the plates of a lap joint adhesive material as a thin uniform layer, with or without a carrier material (as scrim cloth); the use of the adhesive in this fashion contributes to relieve the load on the rivets to a relatively small extent and gives some protection against fretting between the parts joined. It does not, however, prevent fretting at the rivet holes, since the adhesive has a very low shear modulus compared to the metals usually joined in this manner and, therefore, cannot immobilize the joint sufficiently to prevent rubbing at the rivet holes. The relative motion of the joined parts can be reduced by making the adhesive layer very thin; in this case, however, the advantage of distributing the load over the bonded surface by means of the highly elastic adhesive layer is lost, and the adhesive joint becomes weak relative to its surface area. This well known property of lap joints is often remedied by the use of scarfing, i.e., the gradual thinning of the thickness of the joined plates towards their margins. However, in aircraft scarfing is usually not practicable, and it would be difficult to make the adhesive layer thin enough to provide a joint of high shear rigidity.

Accordingly, an object of the invention is to provide an adhesive tape for joining structural parts in which the adhesive layer varies from a very small interior thickness, to provide high rigidity, to a greater thickness near the margins of the adhesive layer, to allow a gradual increase of the shear stress transmitted by the layer from its margins inward and thereby provide the effect achieved by scarfing, as previously discussed.

Another object is to provide an adhesive tape particularly adapted for use in connection with rivets, pins, bolts, or similar fastening devices for reducing the displacements that the joint would suffer in the absence of the adhesive and thereby relieve the fastening devices of a greater part of the load to which they would otherwise be exposed without the adhesive or with conventional adhesives of approximately constant thickness.

Other and further objects will be apparent in the discussion to follow and will be particularly delineated in the appended claims.

By way of summary, the objects of the invention are attained, generally, in an adhesive tape for joining metal or similar structural parts, that comprises, a solid core strip which acts as a carrier for an adhesive. The core strip, which is preferably made of metal, has a Young's modulus at least a substantial fraction of the Young's modulus of the structural parts to be joined and a cross section that diminishes from a substantially thick portion towards at least one edge of the strip. An adhesive layer is disposed on the core strip.

The invention will be described with reference to the accompanying drawing in which.

Figure 1:
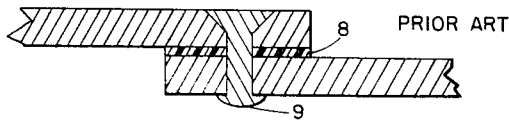
FIG. 1 is a side sectional view of two plates connected together at a riveted lap joint with an adhesive disposed between the plates at the joint and represents one prior art means for effecting a bond between plates.
Figure 2:
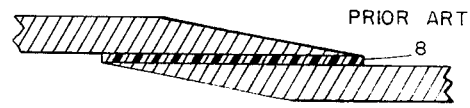
FIG. 2 is a view similar to FIG. 1, except that the plates shown are scarfed in the region of the joint, and discloses a prior art means more useful in wood-to-wood joints than in metal-to-metal joints.
Figure 3:
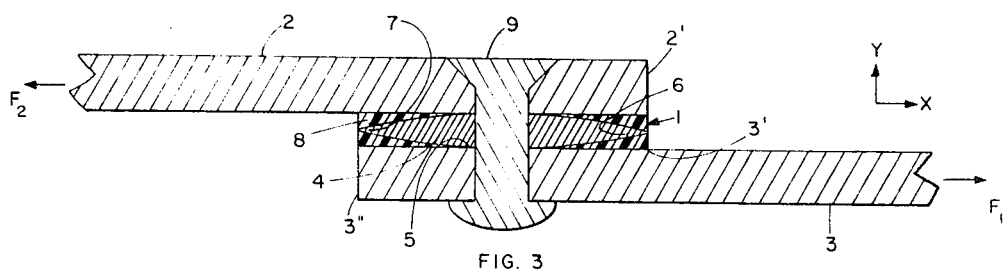
FIG. 3 is a side sectional view of two plates connected together at a riveted lap joint with an adhesive tape embodying the present inventive concept disposed between the plates.

Turning now to the drawing, an adhesive tape is shown at 1 in FIG. 3 for joining structural parts, as the plates shown at 2 and 3. The tape 1 comprises a solid core strip 4 having a cross section that diminishes in thickness from a substantially thick internal or central portion 5 towards the margins 6 and 7 thereof. The Young's modulus of the strip 4 is preferably at least a substantial fraction of the Young's modulus of the structural parts to be joined (but may be greater), and when the plates 2 and 3 are of a metal, the strip 4 is preferably made also of metal. An adhesive layer 8 is disposed upon each major surface of the core strip 4. The plates 2 and 3 shown are secured together by rivets and also by the adhesive 8. The numeral 4 is used throughout to designate the core strip although, as will be evident hereinafter, the cross section shape of the strip may differ between the illustrative examples.

It is in order, now, to discuss the forces acting at the joint in FIG. 3 as a result, for example, of tension forces $F_1$ and $F_2$ in the $x$ direction upon the plates 2 and 3. If a tensile force acts upon the joint shown in FIG. 3, it produces two kinds of displacement between the free end of one plate (as the free end 2' of the plate 2) and the opposite point (designated 3') of the other plate. First, there is a tangential displacement in the direction of the tensile force ($x$ direction), arising from the circumstance that the full force acts in the plate at the region 3' where it faces the free end 2' of the opposite plate, but no force whatever acts at the free end 2'. Second, the tensile force has a tendency to rotate the rivets (as the rivet 9) counterclockwise while the joined margins of the two plates tend to bend so as to move apart at the free ends of both plates, i.e., the free end 2' moves in the $y$ direction relative to the region 3' by virtue of the counterclockwise rotative movement. Since the elastic modulus of the adhesive is much lower than that of the metal plates, the tangential displacement at the margins as well as the amount by which the gap between the plates tends to open up at the margin is not influenced greatly by the adhesive. If the displacements are more or less fixed for a given load, the adhesive layer at the margin suffers a shear strain from the tangential displacement that is inversely proportional to the thickness of the layer. Similarly, the layer suffers a tensile strain in the direction normal to the plates (in the $y$ direction) which is also inversely proportional to its thickness. Since the adhesive tears in shear fracture at some critical magnitude of the shear strain, and in tensile fracture at a critical value of the tensile strain, or it peels off the metal at critical values of the tensile and shear strains, its fracture or peeling is prevented if its thickness in the critical marginal regions is great enough. On the other hand, if the entire layer is thick, it suffers a large uniform shear strain which imposes upon the rivets and holes pressures even higher than they would be exposed to without any adhesive. According to the present invention, however, the adhesive layer is very thin in the interior of the joined area, in particular around the rivets, to reduce the shear elasticity, but its thickness in the marginal parts of the joined area is large enough to prevent dangerously high shear and tensile stresses and strains.

Figure 4:
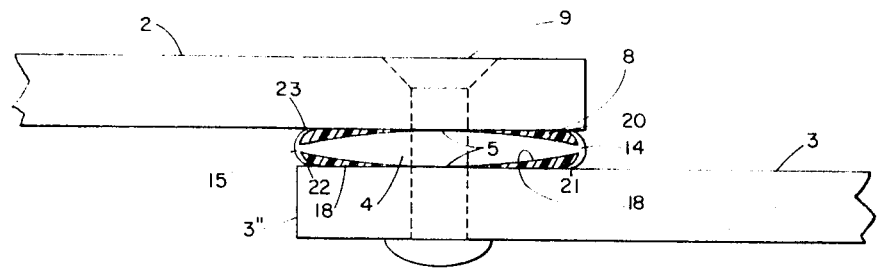
FIG. 4 illustrates a modification of the embodiment of FIG. 3.

As the plates 2 and 3 are pressed together by the rivets 9 in the formation of the joint, there is a tendency for the adhesive 8 to be squeezed out from between the plates; this squeezing out has been retarded hitherto by embedding a fabric of glass fibers or polymer fibers or the like in the adhesive. Also moisture and air can enter the joint to attack the adhesive elements. To prevent either event it is proposed to provide marginal fins as shown at 14 and 15 in FIGS. 4, 5, and 6 and at 16 and 17 in FIG. 7, projecting out of the plane of the strip 4. The adhesive, in this instance, is disposed within recesses 18 formed on either side of the thick portion 5 and between the thick portion and the margins where the strip thickness is increased abruptly to form said fins. The fins 14 and 15 are shown to taper to thin lamina 20, 21, and 22, 23, respectively. The fins should be thin and highly elastic to prevent the possibility of fretting of the plates at the points of contact with the fins under alternating loads. In spite of the thinness, the fins should be effective to prevent extrusion of the adhesive during joining; thus, it is of advantage to curve the fins back towards the interior of the core strip as is shown in FIGS. 4, 5, and 6, or they may be curved inwardly as shown in FIG. 7 where the retroflexed part of the fin is large enough to form a partially closed channel, the two outer surfaces of which (as the surfaces designated 16' and 16'' in FIG. 7) adhere to structural parts joined strongly enough to counteract separation of the plates at the free ends thereof under load, as described previously herein.

The strip 4 may be formed by rolling which may be followed by bending or otherwise forming the fins 14 and 15. The retroflexed fins 16 and 17 in FIG. 7 may be formed by bending the edges of the strip around an axis parallel to the axis of the strip, and, again, recesses 18 are formed between the tape interior and the margins, thereby to retain the adhesive, as before discussed. And, as shown at 24 (and 24' in FIG. 5), the adhesive may completely cover the strip 4, the adhesive at 24 (or 24') being forced towards the margins as the joint is formed as shown, for example, in FIG. 4.

Figures 5, 6, 7:
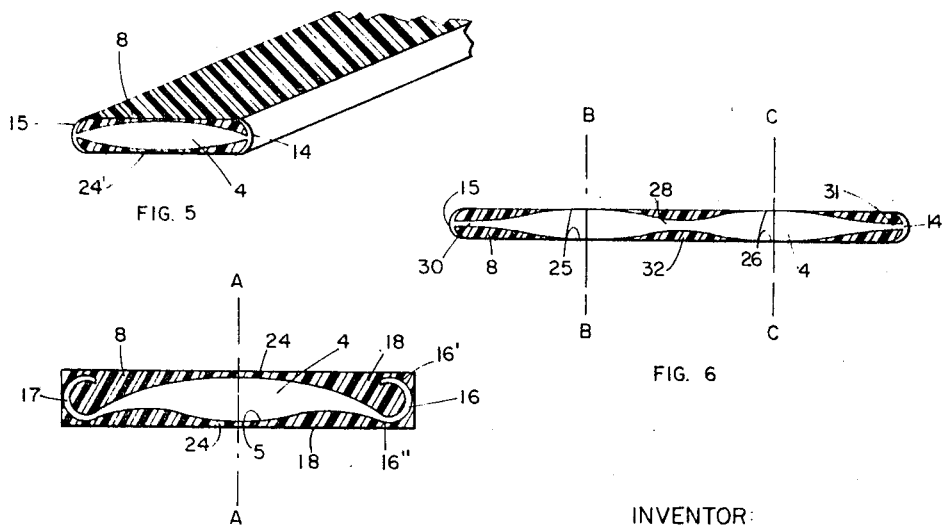
FIG. 5 is an isometric view, on reduced scale, of the adhesive tape shown in end view in FIG. 4.
FIG. 6 is an end view of a modification of the tape of FIG. 3.
FIG. 7 is an end view of a further modification.

In the embodiment of FIG. 6 the core strip 4 contains a plurality of substantially thick portions 25 and 26 alternating transversely with portions of reduced thickness 28, 30, and 31 forming recesses, as the recess designated 32. The rivets 9 in a completed joint are placed with their axes along the lines labeled B—B, and C—C in FIG. 6 and along the line labeled A—A in FIG. 7.

The strip 4 may be fabricated of aluminum alloy, titanium, steel, or other metal or non-metal having the required Young's modulus. If the plates 2 and 3 are a particular metal as, for example, titanium, the strip 4 is preferably made of the same metal to avoid stresses by differential thermal expansion or contraction. The adhesive layer 8 may contain a fabric of glass fiber, polymer fiber, or metal fiber, it being kept in mind that the fabrics should be restricted to the recesses and should not be present in the regions 24 and 24' at the face of the strip 4 over the thick portion 5 where the adhesive layer must be thin for the reasons previously given, unless a very thin fabric tape is used. In addition, the adhesive may contain a filler such as metal powder or the like to increase its rigidity.

In order to show features of the invention distinctly, the thickness of the strip relative to its width is exaggerated in FIGS. 3, 4, 5, 6 and 7. In an actual tape the thickness shown would be reduced to roughly one-half to one-fourth the sizes shown. Also, the shank diameters of the rivets and the thickness of the plates would vary somewhat from the illustrative examples in a manner well known to those skilled in the art.

In order to provide a strip 4 slightly more compressible than the solid strip shown in the figures, it may have one or more very flat shaped channels in its interior extending along the length of the strip.

The term "strip" is used herein in its usual sense to denote a body whose width dimension (W) is much greater than its thickness (T) (W/T≈5) and which is produced in lengths $l > w >$.

Modifications of the invention herein described will occur to those skilled in the art and all such modifications are deemed to be within the spirit and scope of the invention as defined in the appended claims.

What is claimed is:

1. An adhesive tape for joining structural parts that comprises, in combination, a core strip having a thickness dimension much less than its width dimension acting as a carrier for an adhesive, said core strip having a Young's modulus at least a substantial fraction of the Young's modulus of the structural parts to be joined and a cross section that diminishes from a substantially thick portion towards at least one margin of the strip, and an adhesive layer disposed upon both faces of the core strip, said core strip having a cross sectional shape which provides in the space between the parts joined a gap for the adhesive diminishing in thickness from at least one margin toward the interior of the strip, thereby to provide a thin adhesive layer at said thick portion of the core strip and a thicker adhesive layer at said one margin.

2. An adhesive tape as claimed in claim 1, in which the margin of the strip is provided with at least one thin fin projecting out of the plane of the strip to form at least one recess, at least some of the adhesive being disposed within the recess in sufficient amount to fill the gap between the core strip and the structural parts joined.

3. An adhesive strip as claimed in claim 2, in which the margin of the strip is provided with two thin fins projecting outward from opposite faces of the strip to form recesses, at least some of the adhesive being disposed within the recesses in sufficient amount to fill the gap between the core strip and the structural parts joined.

4. An adhesive tape for joining structural parts that comprises, in combination, a core strip having a thickness dimension much less than its width dimension acting as a carrier for an adhesive, said core strip having a Young's modulus at least a substantial fraction of the Young's modulus of the structural parts to be joined and a cross section that diminishes from a substantially thick portion towards both margins of the strip and a layer of adhesive disposed upon both faces of the core strip, the composite tape comprising the core strip and the adhesive being of substantially uniform thickness between the margins.

5. An adhesive tape as claimed in claim 4, said adhesive containing a filler of metal particles.

6. An adhesive tape as claimed in claim 4, in which each margin of the strip is provided with a thin fin projection out of the plane of the strip to form a recess, at least some of the adhesive being disposed within the recess in sufficient amount to fill the gap between the core strip and the structural parts joined, each fin being oriented to point substantially inwardly towards the interior of the core strip.

7. An adhesive tape as claimed in claim 6 and in which said at least one fin is curved inwardly towards the interior of the core strip to present two substantial surfaces each adhering to one of the structural parts joined.

8. An adhesive tape as claimed in claim 4 in which the core strip is metallic.

9. An adhesive tape as claimed in claim 4 in which the adhesive layer contains embedded reinforcing woven glass fiber.

10. An adhesive tape as claimed in claim 4 in which the adhesive layer contains embedded polymer fiber.

11. An adhesive tape as claimed in claim 4 in which the adhesive layer contains embedded metal fiber.

12. An adhesive tape as claimed in claim 4 in which the core strip has a plurality of substantially thick portions alternating with portions of reduced thickness forming recesses.

13. An adhesive tape as claimed in claim 12 in which the thickness of the strip at said margins is increased abruptly to substantially the thickness of said thick portion to provide fins at the margins.

14. An adhesive tape as claimed in claim 4 in which the thickness of the core strip at said margins is increased abruptly to substantially the thickness of said thick portion to provide fins at the margins.

15. An adhesive tape as claimed in claim 14 in which each margin of the strip is provided with two thin fins projecting outward from opposite faces of the strip to form recesses, at least some of the adhesive being disposed within the recesses in sufficient amount to fill the gap between the core strip and the structural parts joined.

16. An adhesive tape as claimed in claim 4 having fins at said margins, the fins being curved inwardly towards the interior of the core strip, the retroflexed part of each fin being large enough to form a partially closed channel the two outer surfaces of which are adapted to adhere to the structural parts joined.

17. An adhesive tape for joining structural parts that comprises, in combination, a core strip having a cross section of non-uniform thickness and having a maximum thickness dimension much less than the width dimension of the strip acting as a carrier for an adhesive, said core strip having a Young's modulus at least a substantial fraction of the Young's modulus of the structural parts to be joined, and an adhesive layer disposed upon the both faces of the core strip, said core strip having a cross sectional shape which provides in the space between the joined parts a gap for adhesive that diminishes in thickness from at least one margin of the strip toward the interior region thereof, thereby to provide a thin adhesive layer at said interior region of the core strip and a thicker adhesive layer at said one margin.

\* \* \* \* \*